(12) United States Patent
Martinell et al.

(10) Patent No.: US 9,902,236 B2
(45) Date of Patent: Feb. 27, 2018

(54) EQUIPMENT FOR CONTROLLING THE TEMPERATURE OF A PASSENGER COMPARTMENT OF A VEHICLE, IN PARTICULAR AN ELECTRIC VEHICLE

(71) Applicant: Valeo Systemes Thermiques, Les Mesnil Saint Denis (FR)

(72) Inventors: Amanda Martinell, Neauphle le Chateau (FR); Fabrice Ailloud, Guyancourt (FR); Didier Loup, Maurepas (FR); Philippe Vincent, Epernon (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 365 days.

(21) Appl. No.: 14/405,937

(22) PCT Filed: Jun. 7, 2013

(86) PCT No.: PCT/EP2013/061860
§ 371 (c)(1),
(2) Date: Dec. 5, 2014

(87) PCT Pub. No.: WO2013/182706
PCT Pub. Date: Dec. 12, 2013

(65) Prior Publication Data
US 2015/0144707 A1    May 28, 2015

(30) Foreign Application Priority Data
Jun. 8, 2012   (FR) ...................................... 12 55401

(51) Int. Cl.
*B60H 1/22* (2006.01)
*B60H 1/00* (2006.01)

(52) U.S. Cl.
CPC ....... *B60H 1/2225* (2013.01); *B60H 1/00042* (2013.01); *B60H 1/00071* (2013.01);
(Continued)

(58) Field of Classification Search
CPC .............. B60H 1/2225; B60H 1/00042; B60H 1/00071; B60H 1/00392; B60H 1/00542; B60H 2001/00128
(Continued)

(56) References Cited

U.S. PATENT DOCUMENTS 5,571,432 A    11/1996   Sarbach
5,738,579 A    4/1998    Pommier et al.
(Continued)

FOREIGN PATENT DOCUMENTS

EP    0081656 A2 *  6/1983  ............. B60K 37/00
EP    0 392 296 A1  10/1990
(Continued)

OTHER PUBLICATIONS

"FR_2703305_A1_M—Machine Translation.pdf", machine translation, EPO.org, May 23, 2017.*
(Continued)

*Primary Examiner* — Gregory Huson
*Assistant Examiner* — Daniel E Namay
(74) *Attorney, Agent, or Firm* — Howard & Howard Attorneys PLLC

(57) ABSTRACT

The invention relates to temperature control equipment (3) for a vehicle, in particular an electric vehicle, enabling an aerothermic adjustment of an airflow to be distributed in a passenger compartment (H) of the vehicle, including at least one heat treatment module (8), capable of heat-treating the airflow, and a distribution module (9), capable of distributing the airflow to the passenger compartment (H). The heat treatment module (8) comprises a single means (21) for (Continued)

heating the airflow to be distributed in the passenger compartment (H), which consists of an electric radiator (21).

14 Claims, 2 Drawing Sheets

(52) U.S. Cl.
CPC ..... *B60H 1/00392* (2013.01); *B60H 1/00542* (2013.01); *B60H 2001/00128* (2013.01)

(58) Field of Classification Search
USPC .............................. 237/28; 454/2, 139, 162
See application file for complete search history.

(56) References Cited

U.S. PATENT DOCUMENTS

| | | | | |
|---|---|---|---|---|
| 6,351,962 | B1* | 3/2002 | Mizutani | B60H 1/00528 180/90 |
| 9,616,732 | B2* | 4/2017 | Marx | B60H 1/28 |
| 2003/0042011 | A1* | 3/2003 | Vincent | B60H 1/00064 165/203 |
| 2004/0152410 | A1* | 8/2004 | Seki | B60H 1/00685 454/139 |
| 2012/0289140 | A1* | 11/2012 | Marx | B60H 1/28 454/162 |

FOREIGN PATENT DOCUMENTS

| | | | | |
|---|---|---|---|---|
| EP | 0 567 402 | A1 | | 10/1993 |
| EP | 0 780 251 | A1 | | 6/1997 |
| EP | 2 211 589 | A1 | | 7/2010 |
| FR | 2 703 305 | A1 | | 10/1994 |
| JP | 63170119 | A * | 7/1988 | ......... B60H 1/00064 |
| JP | 05278448 | A * | 10/1993 | |
| JP | 2000264042 | A * | 9/2000 | ......... B60H 1/00064 |
| JP | 2006205924 | A * | 8/2006 | |
| JP | 2008179202 | A * | 8/2008 | ........... B60H 1/2218 |

OTHER PUBLICATIONS

International Search Report for Application No. PCT/EP2013/061860 dated Jul. 24, 2013, 7 pages.
English language abstract and machine-assisted English translation for EP 0 392 296 extracted from espacenet.com database on Feb. 16, 2015, 10 pages.
English language abstract for EP 0 567 402 extracted from espacenet.com database on Feb. 16, 2015, 2 pages.
English language abstract for EP 0 780 251 extracted from espacenet.com database on Feb. 16, 2015, 1 page.
English language abstract and machine-assisted English translation for EP 2 211 589 extracted from espacenet.com database on Feb. 16, 2015, 29 pages.
English language abstract and machine-assisted English translation for FR 2 703 305 extracted from espacenet.com database on Feb. 16, 2015, 17 pages.

* cited by examiner

EQUIPMENT FOR CONTROLLING THE TEMPERATURE OF A PASSENGER COMPARTMENT OF A VEHICLE, IN PARTICULAR AN ELECTRIC VEHICLE

CROSS-REFERENCE TO RELATED APPLICATIONS

This application is the National Stage of International Patent Application No. PCT/EP2013/061860, filed on Jun. 7, 2013, which claims priority to and all the advantages of French Patent Application No. FR 1255401, filed on Jun. 8, 2012, the content of which is incorporated herein by reference.

The technical field of the present invention is that of thermal conditioning installations for a passenger compartment of a motor vehicle, in particular an electric vehicle.

BACKGROUND

It is known to provide the thermal management of a vehicle passenger compartment by means of a heating, ventilating and/or air-conditioning installation arranged in the passenger compartment of the vehicle. Such a heating, ventilating and or air-conditioning installation comprises a housing that delimits a circulation canal for an airflow that is intended to be diffused into the passenger compartment. A heat exchanger is disposed in the circulation canal in order to modify the temperature of the airflow before it is diffused into the passenger compartment, depending on a command fixed by an occupant of the vehicle. Such a housing also comprises a distribution system that channels the airflow into various regions of the passenger compartment, in particular a region disposed at a windscreen of the vehicle, and a lower region, a median region or an upper region of the passenger compartment of the vehicle.

The housing of the heating, ventilating and/or air-conditioning installation is installed in the passenger compartment, between an instrument panel of the vehicle and a wall separating the passenger compartment and an engine compartment of the vehicle.

The propulsion of the vehicle can be ensured by a combustion engine or by a hybrid engine or fully electric motor.

However, the heating, ventilating and/or air-conditioning installations that are known from the prior art are not appropriate for the thermal management of the passenger compartment of an electric vehicle. Specifically, the autonomy of such electric vehicles is conditioned at least in part by an energy source formed for example by a battery.

Furthermore, for the comfort of the occupants of the vehicle, it is desirable for the internal space of the passenger compartment to be as large as possible. However, the overall dimensions of the vehicle are defined so as to correspond to specific uses. In particular, for urban usage, the dimensions of the vehicle are reduced.

In such a configuration, in order to maintain an acceptable level of comfort, in particular for a vehicle for urban usage, it is desirable to reduce the size of certain components, for example the instrument panel. Such a reduction in size thus makes it impossible to position a heating, ventilating and/or air-conditioning installation as is known from the prior art.

In addition, in an electric vehicle, the heating function is provided by an electric radiator, in particular a high-voltage electric radiator. The use of such an electric radiator is associated with restrictions relating to the safety of persons, so as to avoid any risk of electrocution of occupants of the vehicle.

Finally, in order to provide optimal comfort for the occupants, it is necessary to provide an additional stratification function that makes it possible to create a difference in temperature between two air-outlet openings so as to diffuse the airflow into two different regions of the passenger compartment, in particular between the air-outlet opening of the lower region and the air-outlet opening of the median region of the passenger compartment of the vehicle, at different temperatures.

In order to take into account the drawbacks and restrictions described in detail above, the subject of the present invention is thus a thermal conditioning installation for a vehicle, in particular an electric vehicle, allowing aerothermal adjustment of an airflow intended to be diffused into a passenger compartment of the vehicle, comprising at least one heat treatment module that is able to thermally treat the airflow, and a distribution module that is able to distribute the airflow in the passenger compartment. In addition, the heat treatment module comprises a single means for heating the airflow intended to be diffused into the passenger compartment, said heating means being formed by an electric radiator.

Furthermore, the thermal conditioning installation comprises a bypass duct comprising a downstream opening disposed downstream of the electric radiator and an upstream opening disposed upstream of the electric radiator.

In addition, advantageously, the thermal conditioning installation comprises at least one air distribution chamber disposed downstream of the electric radiator.

Preferably, the air distribution chamber is arranged in the distribution module.

In particular, the distribution module comprises at least one "footwell" distribution canal and an "aeration" distribution canal, which are disposed downstream of the air distribution chamber.

SUMMARY OF THE INVENTION

According to a particular embodiment, the downstream opening of the bypass duct opens into the "aeration" distribution canal.

Alternatively or in addition, the bypass duct comprises at least one regulating member for calibrating the amount of the airflow circulating in the bypass duct. According to the present invention, such a regulating member is disposed at the downstream opening and/or at the upstream opening of the bypass duct.

Preferably, the bypass duct extends in the heat treatment module and in the distribution module.

Finally, according to additional features, the heat treatment module comprises a heat treatment housing in which the electric radiator is housed, and, advantageously, at least one engine fan that is able to force the circulation of the airflow in the thermal conditioning installation.

Of course, the various features, variants and/or embodiments of the present invention can be associated with one another in various combinations inasmuch as they are not mutually incompatible or exclusive.

The present invention will be better understood and further features and advantages will become more apparent on reading the following detailed description comprising embodiments that are given by way of illustration with reference to the appended figures, which are presented by way of nonlimiting examples and which may serve to supplement the understanding of the present invention and the explanation of how it is embodied, and, if appropriate, contribute to defining it, and in which:

FIG. 1 is a partially exploded perspective view of a thermal conditioning system according to the present invention, FIG. 2 is a perspective view of the thermal conditioning system from FIG. 1, FIG. 3 is a side view of the thermal conditioning system from FIG. 1, and FIG. 4 is a cross-sectional view of the thermal conditioning system from FIG. 3 on a median plane P.

It should be noted that, in the figures, the structural and/or functional elements that are common to the various embodiments can have the same references. Thus, unless mentioned otherwise, such elements have identical structural, dimensional and material properties.

According to the present invention, the terms "downstream", "upstream", "in series" and "parallel" qualify the position of one component with respect to another, in the direction of circulation of an airflow in a thermal conditioning installation according to the present invention.

FIGS. 1 and 2 are, respectively, perspective views of a thermal conditioning system 1 for a passenger compartment, in particular of an electric vehicle. Such a thermal conditioning system 1 comprises, firstly, a separating wall 2 separating a passenger compartment H and a front compartment A of the vehicle, and, secondly, a thermal conditioning installation 3 for aerothermal adjustment of an airflow intended to be diffused into the passenger compartment H.

More particularly, FIG. 1 shows the thermal conditioning system 1 prior to the mounting of the separating wall 2 and the thermal conditioning installation 3. FIG. 2 shows the thermal conditioning system 1 following the mounting of the separating wall 2 and the thermal conditioning installation 3.

BRIEF DESCRIPTION OF THE DRAWINGS

The separating wall 2 takes the form, for example, of a metal sheet that extends substantially vertically between a floor and a front windscreen (these not being shown) of the vehicle.

The front compartment A of the vehicle may for example hold one or more components of a drive train of the vehicle, for example an electric motor, an inverter, computers, etc.

Figure 1:
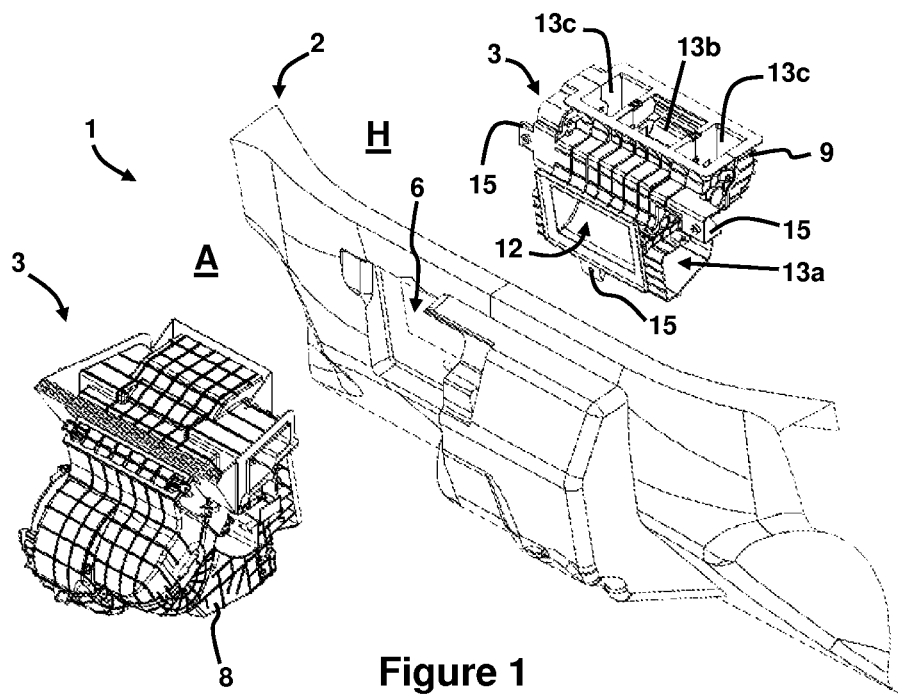
Figure 2:
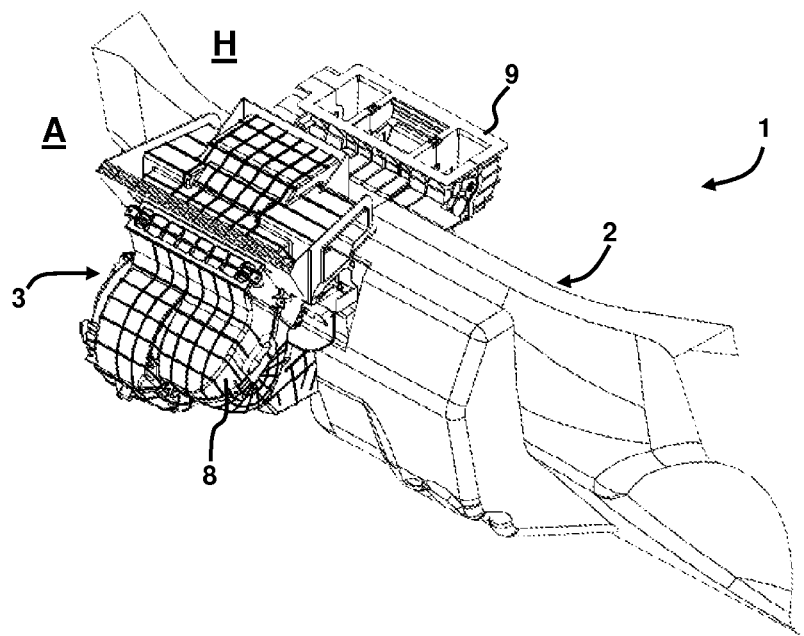

The separating wall 2 also comprises at least one through-passage 6. Preferably, the separating wall 2 comprises a mating strip arranged around the through-passage 6 and against which the thermal conditioning installation 3 bears.

According to the present invention, the thermal conditioning installation 3 consists of a heat treatment module 8 for aerothermal adjustment of the airflow intended to be diffused into the passenger compartment H, and of a distribution module 9 for distributing the airflow thermally treated in the heat treatment module 8 into different regions of the passenger compartment H, in particular a region located at a windscreen of the vehicle, or "defrosting region", a region located in the lower part of the passenger compartment H, or "footwell region", a region located in the median part of an instrument panel of the vehicle or a lateral region of the passenger compartment H of the vehicle, or "aeration region".

DETAILED DESCRIPTION

According to a particular, nonlimiting exemplary embodiment, the heat treatment module 8 and the distribution model 9 are two distinct and separate subassemblies of the thermal conditioning installation 3. More particularly, the heat treatment module 8 and the distribution module 9 are only connected together by a fastening means at the through-passage 6. However, the heat treatment module 8 and the distribution module 9 are in aeraulic communication such that the airflow which is aerothermally adjusted by the heat treatment module 8 circulates in the distribution module 9, through the through-passage 6, before being diffused into the passenger compartment H.

According to one variant embodiment, the heat treatment module 8 is disposed in the front compartment A and the distribution module 9 is disposed in the passenger compartment H.

Preferably, the thermal conditioning installation 3 is secured to the separating wall 2, with the aid of securing means dedicated for this purpose. By way of example, the distribution module 9 comprises one or more fixing tabs 15 for fixing the thermal conditioning installation 3 to the separating wall 2.

Figure 3:
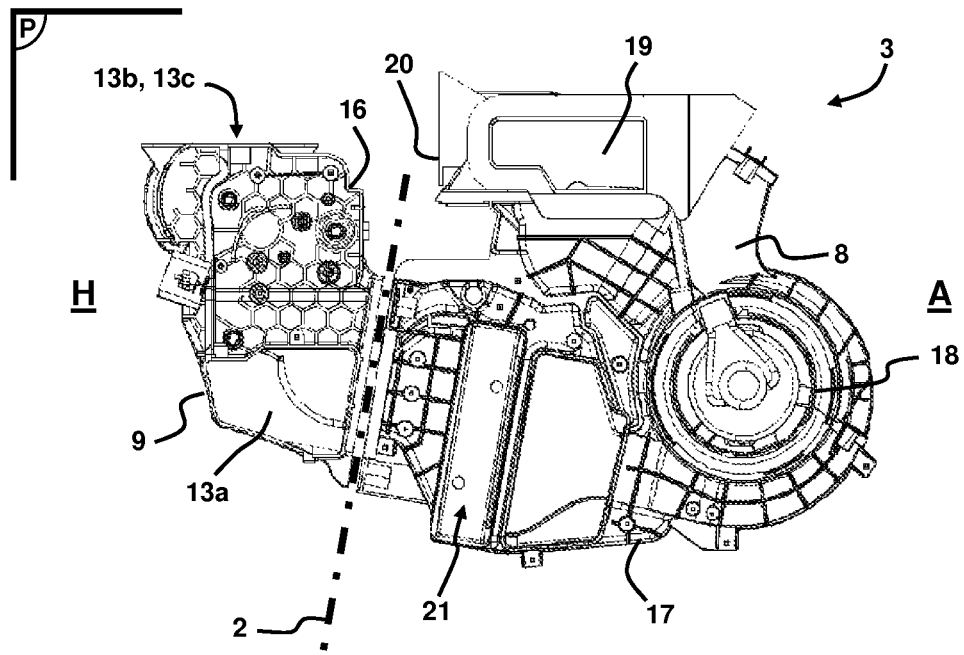
Figure 4:
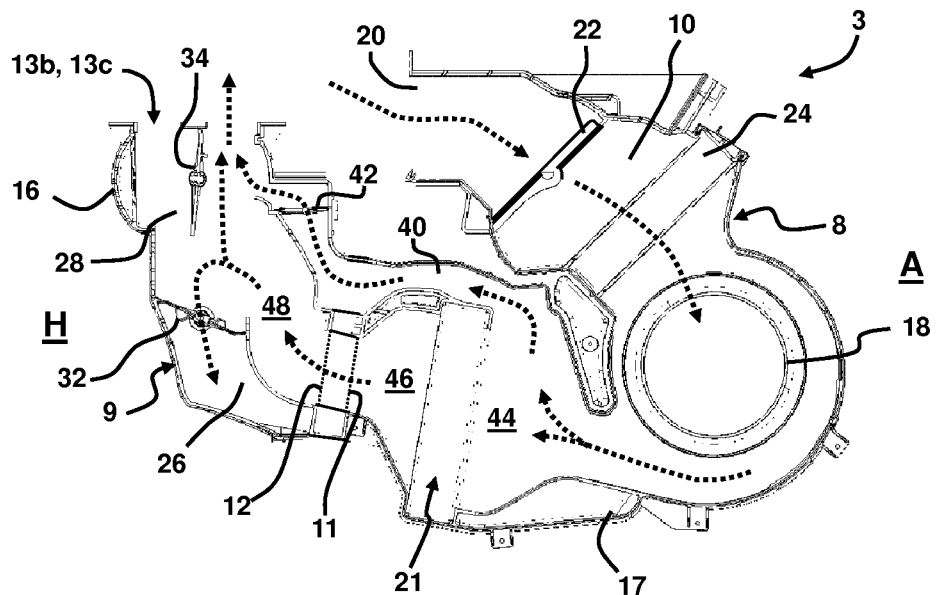

FIG. 3 is a side view of the thermal conditioning system 1 from FIG. 1 and illustrates the thermal conditioning installation 3 that is able to aerothermally adjust the airflow intended to be diffused into the passenger compartment H. In FIG. 3, the separating wall 2 arranged between the passenger compartment H and the front compartment A of the vehicle has been shown by way of a dotted line. In addition, FIG. 4 is a cross-sectional view on a plane P of the thermal conditioning system 3 from FIG. 3. More specifically, the plane P is a median plane of the thermal conditioning installation 3, said plane being disposed parallel to a longitudinal direction extending from the passenger compartment H to the front compartment A.

The heat treatment module 8 is that part of the thermal conditioning installation 3 that forces the movement of the airflow intended to be diffused into the passenger compartment H, for example by way of an engine fan 18. In addition, the heat treatment module 8 also thermally adjusts the airflow intended to be diffused into the passenger compartment H, in particular by heating it up and/or cooling it down, for example by way of at least one heat exchanger. The heat treatment module 8 comprises at least one treated-air outlet 11 of the heat treatment module 8.

The heat treatment module 8 comprises a heat treatment housing 17 in which at least the engine fan 18 for forcing the circulation of the airflow in the thermal conditioning installation 3 is arranged. Such an engine fan 18 comprises for example an electric motor that rotates a radial turbine disposed in the heat treatment housing 17 delimiting the heat treatment module 8.

The heat treatment housing 17 also comprises at least one air circulation canal 10 that channels the airflow between at least one air inlet, advantageously an outside-air inlet 19 and/or an inside-air inlet 20, and the treated-air outlet 11.

According to the exemplary embodiment presented, the heat treatment module 8 comprises the outside-air inlet 19 and the inside-air inlet 20. The outside-air inlet 19 is the one through which an airflow external to the passenger compartment H passes into the heat treatment module 8, and the inside-air inlet 20 is the one through which an airflow originating from the passenger compartment H passes into the heat treatment module 8.

Advantageously, according to a particular embodiment that is not shown, the separating wall 2 comprises a complementary opening, separate from the through-passage 6 for providing the aeraulic connection between the heat treatment module 8 and the distribution module 9. Such a complementary opening allows the airflow originating from the passenger compartment H to be introduced into the heat treatment module 8.

According to the exemplary embodiment presented, the heat treatment module 8 comprises two outside-air inlets 19 that are disposed laterally on each side of the heat treatment housing 17, and a single inside-air inlet 20 that is arranged in the median part and is disposed between the two outside-air inlets 19.

The heat treatment module 8 also comprises means 22 for selecting the airflow admitted into the heat treatment housing 17 from the outside-air inlet 19 and/or the inside-air inlet 20. It is thus possible to allow admission exclusively of the outside airflow or exclusively of the inside airflow or of a mixture of the outside airflow and the inside airflow. Such a selection means 22 takes the form for example of one or more flaps disposed between the outside air inlet 19 and the inside-air inlet 20.

In FIG. 4, the airflow that is admitted into the thermal conditioning installation 3 and circulates in the heat treatment module 8 and the distribution module 9 is shown by way of dotted lines.

In a complementary manner, the heat treatment module 8 may also comprise a filtering device 24, formed in particular by a filter. Preferably, the filtering device 24 is arranged between the outside-air inlet 19 and the inside-air inlet 20 and the engine fan 18.

The heat treatment module 8 also makes it possible to aerothermally treat the airflow intended to be diffused into the passenger compartment H by modifying the temperature thereof. To this end, the heat treatment module 8 comprises a heating means 21 in the form of a first heat exchanger 21. According to the present invention, such a first heat exchanger 21 is an electric radiator 21 comprising heating elements, in particular electrical resistors, in particular resistors having a positive temperature coefficient, that are able to heat and provide heat exchange with the airflow passing through the electric radiator when it is supplied with a current, in particular a high-voltage current, for example of between 150 V and 500 V.

According to the present invention, the electric radiator 21 is the only means 21 for heating the airflow intended to be diffused into the passenger compartment H that is arranged in the heat treatment module 8. Thus, according to the present invention, the electric radiator 21 is the only means for raising the temperature of the airflow intended to be diffused into the passenger compartment H.

In a complementary manner, the heat treatment module 8 may also hold a second heat exchanger (not shown), through which a coolant fluid that is able to cool the airflow intended to be diffused into the passenger compartment H advantageously passes. The second heat exchanger thus functions as an evaporator. Such a second heat exchanger is then connected to the coolant fluid circuit by way of two pipes and an expansion member. Thus, according to the present invention, the second heat exchanger helps only to lower the temperature of the airflow intended to be diffused into the passenger compartment H. The second heat exchanger is not able to raise the temperature of the airflow intended to be diffused into the passenger compartment H.

The distribution module 9 comprises a distribution housing 16 in which at least one air distribution canal is disposed. According to the exemplary embodiment presented in the figures, the distribution module 9 comprises a plurality of air distribution canals, in particular a "footwell" distribution canal 26, an "aeration" distribution canal 28 and a "defrosting" distribution canal (not visible in the figures), which are respectively delimited, on the one hand, by a treated-air inlet 12 of the distribution module 9 and, on the other hand, at least one respective air-outlet opening, in particular a first air-outlet opening 13a, a second air-outlet opening 13b and a third air-outlet opening 13c.

According to the exemplary embodiment presented in the figures, the "footwell" distribution canal 26 leads into the first air-outlet opening 13a allocated to the "footwell region" and formed in a lower part of the distribution module 9. The "aeration" distribution canal 28 leads into the second air-outlet opening 13b allocated to the "aeration region" and formed in an upper part of the distribution module 9. The "defrosting" distribution canal leads into the third air-outlet opening 13c allocated to the "defrosting region" and formed in an upper part of the distribution module 9.

According to the present invention, advantageously, the distribution module 9 has no heat exchanger. Such a function of modifying the temperature of the airflow is allocated to the heat treatment module 8, thereby making it possible to significantly reduce the external size of the distribution module 9 in order to limit the space taken up under the instrument panel.

The distribution module 1 may comprise at least one flap that is arranged in the distribution housing 16 and is able to manage the amount of airflow sent to one and/or the other of the respective air-outlet openings, in particular the first air-outlet opening 13a, the second air-outlet opening 13b and the third air-outlet opening 13c. In particular, the distribution module 9 comprises at least:

a "footwell" flap 32 arranged in the "footwell" distribution canal 26 in order to manage the amount of airflow sent into the first air-outlet opening 13a, an "aeration" flap 34 arranged in the "aeration" distribution canal 28 in order to manage the amount of airflow sent into the second air-outlet opening 13b, and a "defrosting" flap (not visible in the figures) arranged in the "defrosting" distribution canal in order to manage the amount of airflow sent into the third air-outlet opening 13c.

The distribution module 9 is that part of the thermal conditioning installation 3 that distributes the airflow coming from the heat treatment module 8 to the various regions of the passenger compartment H, in particular the region located at a windscreen of the vehicle, or "defrosting region", the region located in the lower part of the passenger compartment H, or "footwell region", the region in the median part of an instrument panel of the vehicle or a lateral region of the passenger compartment H of the vehicle, or "aeration region".

In addition, according to a particular embodiment that is not shown, the distribution module 9 may comprise air ducts, in particular an air duct leading to the region disposed at the windscreen of the vehicle and an air duct leading to the median region and/or the upper region of the passenger compartment of the vehicle.

The treated-air inlet 12 of the distribution module 9 is in aeraulic communication with the treated-air outlet 11 of the heat treatment module 8.

Preferably, all of the airflow to be thermally treated and intended to be diffused into the passenger compartment H passes through the electric radiator 21. Thus, in order to thermally adjust the airflow, the temperature is managed by electric control of the electric radiator 21. The supply voltage of the electric radiator 21 is modulated in order to define different heating powers dissipated by the electric radiator 21.

According to the present invention, the thermal conditioning installation 3 comprises an air-intake chamber 44 disposed downstream of the engine fan 18 and upstream of the electric radiator 21. Consequently, the air-intake chamber 44 receives the airflow leaving the engine fan 18. According to a variant embodiment, the air-intake chamber 44 is arranged in the heat treatment module 8.

In addition, the heat treatment installation 3 comprises a treated-air chamber 46 disposed downstream of the electric radiator 21. Consequently, the treated-air chamber 46 receives the thermally treated airflow after it has passed through the electric radiator 21. According to a variant embodiment, the treated-air chamber 46 is arranged in the heat treatment module 8 and/or in the distribution module 9.

Finally, the thermal conditioning installation 3 comprises an air distribution chamber 48 disposed downstream of the electric radiator 21, preferably downstream of the treated-air chamber 46, and upstream of the various distribution canals, in particular the "footwell" distribution canal 26, the "aeration" distribution canal 28 and the "defrosting" distribution canal. The air distribution chamber 48 receives the airflow leaving the treated-air chamber 46. According to a variant embodiment, the air distribution chamber 48 is arranged in the distribution module 9.

The air distribution chamber 48 is aeraulically connected to the various air distribution canals, in particular to the "footwell" distribution canal 26, the "aeration" distribution canal 28 and/or the "defrosting" distribution canal.

Thus, from the air distribution chamber 48, the airflow is distributed in the various air distribution canals, in particular the "footwell" distribution canal 26, in the "aeration" distribution canal 28 and/or in the "defrosting" distribution canal.

In order to provide the additional stratification function, making it possible to create a difference in temperature between two air-outlet openings, in particular between the first air-outlet opening 13a and the second air-outlet opening 13b, the thermal conditioning installation 3 comprises a bypass duct 40. Preferably, the bypass duct 40 extends in the heat treatment module 8 and in the distribution module 9.

More specifically, the bypass duct 40 comprises an upstream opening that opens into the air-intake chamber 44. In addition, the bypass duct 40 comprises a downstream opening that opens into at least one of the air distribution channels.

Preferably, in order to ensure the difference in temperature between the first air-outlet opening 13a that opens into the "footwell region" and the second air-outlet opening 13b that opens into the "aeration region", the downstream opening of the bypass duct 40 is disposed in the "aeration" distribution canal 28.

Consequently, the airflow circulating in the bypass duct 40 does not pass through the electric radiator 21. Thus, the airflow can bypass at least the electric radiator 21 by circulating in the bypass duct 40. To this end, the upstream opening of the bypass duct 40 is disposed upstream of the electric radiator 21 and the downstream opening of the bypass duct 40 is disposed downstream of the electric radiator 21.

Preferably, the bypass duct 40 emerges downstream of the air distribution chamber 48. Thus, the airflow can bypass the electric radiator 21, the treated-air chamber 46 and the air distribution chamber 48 by circulating in the bypass duct 40.

The airflow circulating in the bypass duct 40 is not thermally treated by the electric radiator 21. Thus, the airflow circulating in the bypass duct 40 and arriving in the "aeration" distribution canal 28 is mixed with the airflow coming from the air distribution chamber 48, in which the airflow has been thermally treated, and is channeled toward the "aeration" distribution canal 28.

Consequently, the temperature of the airflow diffused through the second air-outlet opening 13b that opens into the "aeration zone" is lower than the temperature of the airflow diffused through the first air-outlet opening 13a that opens into the "footwell region".

Specifically, the airflow circulating in the bypass duct 40 makes it possible to soften the airflow coming from the air distribution chamber 48.

In order to calibrate the amount of the airflow circulating in the bypass duct 40 and entering the dedicated air distribution canal, in particular the "aeration" distribution canal 28, the bypass duct 40 comprises at least one regulating member 42, for example in the form of one or more flaps. Preferably, the regulating member 42 is disposed at the downstream opening of the bypass duct 40. Alternatively or in addition, the regulating member 42 is disposed at the upstream opening of the bypass duct 40.

Of course, the invention is not limited to the embodiments described above and provided only by way of example. It encompasses various modifications, alternative forms and other variants which may be envisaged by a person skilled in the art within the scope of the present invention, and in particular any combinations of the various operating modes described above, which can be taken separately or in combination.

The invention claimed is:

1. A thermal conditioning installation for allowing aerothermal adjustment of an airflow to be diffused into a passenger compartment (H) of a vehicle including a separating wall having a first side and a second side opposite the first side with a through-passage extending through the first side and the second side, the thermal conditioning installation comprising;

at least one heat treatment module configured to thermally treat the airflow and configured to mount to the first side of the separating wall, and a distribution module configured to distribute the airflow in the passenger compartment (H) and configured to mount to the second side of the separating wall, wherein the heat treatment module comprises a single means for heating the airflow intended to be diffused into the passenger compartment (H), said heating means being formed by an electric radiator; and a bypass duct comprising a downstream opening disposed downstream of the electric radiator and an upstream opening disposed upstream of the electric radiator with the bypass duct comprising two regulating members for calibrating the amount of the airflow circulating in the bypass duct at least one air distribution chamber arranged in the distribution chamber and disposed downstream of the electric radiator;

wherein the distribution module comprises at least one footwell distribution canal and an aeration distribution canal, both disposed downstream of the air distribution chamber; and wherein a downstream opening of the bypass duct opens into the aeration distribution canal;

wherein the heat treatment module and the distribution module are separate assemblies and configured to be in aerial communication when mounted to the separating wall such that the airflow which is aerothermally adjusted by the heat treatment module circulates in the distribution module, through the through-passage, before being diffused into the passenger compartment (H).

2. The thermal conditioning installation as claimed in claim 1, wherein a first regulating member is disposed at the downstream opening and a second regulating member is disposed at the upstream opening of the bypass duct, respectively.

3. The thermal conditioning installation as claimed in claim 1, wherein the bypass duct extends in the heat treatment module and in the distribution module.

4. The thermal conditioning installation as claimed in claim 1, wherein the heat treatment module comprises a heat treatment housing in which the electric radiator is housed.

5. The thermal conditioning installation as claimed in claim 4, wherein the heat treatment housing comprises at least one engine fan configured to force the circulation of the airflow in the thermal conditioning installation.

6. The thermal conditioning installation of claim 1, further comprising a defrosting distribution canal for managing air flow.

7. The thermal condition installation of claim 6, wherein the footwell distribution canal comprises a footwell flap, the aeration distribution canal comprises an aeration flap, and the defrosting distribution canal comprises a defrosting flap.

8. The thermal conditioning installation of claim 1, wherein the bypass duct is defined by a housing and an interior structure that is different than the two regulating members.

9. A vehicle comprising:
   a separating wall having a first side facing an engine compartment and a second side opposite the first side and facing the passenger compartment (H) with the separating wall having a through-passage extending through the first side and the second side; and
   a thermal conditioning installation comprising,
      at least one heat treatment module configured to thermally treat an airflow and mounted to the first side of the separating wall,
      a distribution module configured to distribute the airflow in the passenger compartment (H) of the vehicle and mounted to the second side of the separating wall,
      a bypass duct comprising a downstream opening disposed downstream of the electric radiator and an upstream opening disposed upstream of the electric radiator with the bypass duct comprising two regulating members for calibrating the amount of the airflow circulating in the bypass duct; and
      at least one air distribution chamber arranged in the distribution chamber and disposed downstream of the electric radiator;
   wherein the distribution module comprises at least one footwell distribution canal and an aeration distribution canal, both disposed downstream of the air distribution chamber;
   wherein a downstream opening of the bypass duct opens into the aeration distribution canal;
   wherein the heat treatment module comprises a single means for heating the airflow intended to be diffused into the passenger compartment (H), said heating means being formed by an electric radiator, and
   wherein the heat treatment module and the distribution module are separate assemblies configured to be in aerial communication when mounted to the separating wall such that the airflow which is aerothermally adjusted by the heat treatment module circulates in the distribution module, through the through-passage, before being diffused into the passenger compartment (H).

10. The vehicle of claim 9 wherein the separating wall comprises a mating strip arranged around the through-passage and against which the thermal conditioning installation bears.

11. The vehicle of claim 9 wherein the thermal conditioning installation comprises a means for securing the thermal conditioning installation to the separating wall.

12. The vehicle of claim 9, wherein the thermal conditioning installation further comprises a defrosting distribution canal for managing air flow.

13. The vehicle of claim 12, wherein the footwell distribution canal comprises a footwell flap, the aeration distribution canal comprises an aeration flap, and the defrosting distribution canal comprises a defrosting flap.

14. The vehicle of claim 9, wherein the bypass duct is defined by a housing and an interior structure that is different than the two regulating members.

* * * * *

UNITED STATES PATENT AND TRADEMARK OFFICE
CERTIFICATE OF CORRECTION

PATENT NO. : 9,902,236 B2
APPLICATION NO. : 14/405937
DATED : February 27, 2018
INVENTOR(S) : Amanda Martinell et al.

Page 1 of 1

It is certified that error appears in the above-identified patent and that said Letters Patent is hereby corrected as shown below:

In the Claims

Column 8, Line 53, Claim 1: delete "duct at" and replace with -- duct; at --

Column 8, Line 55, Claim 1: delete "chamber" and replace with -- module --

Column 10, Line 6, Claim 9: delete "chamber" and replace with -- module --

Signed and Sealed this
Tenth Day of July, 2018

Andrei Iancu
*Director of the United States Patent and Trademark Office*